United States Patent Office 3,341,522
Patented Sept. 12, 1967

3,341,522
STEROIDAL PYRIMIDINES OF THE ANDROSTANE AND ESTRANE SERIES AND INTERMEDIATES FOR THEIR PRODUCTION
Pietro de Ruggieri, Carmelo Gandolfi, and Domenico Chiaramonti, Milan, Italy, assignors to Ormonoterapia Richter S.p.A., Milan, Italy
No Drawing. Filed Aug. 6, 1962, Ser. No. 214,848
Claims priority, application Italy, Aug. 5, 1961, 14,490/61; May 12, 1962, 9,510/62
21 Claims. (Cl. 260—239.5)

The present invention relates to the compounds of the general formula

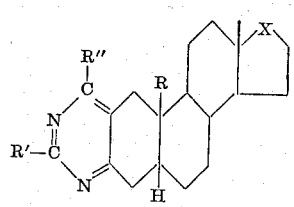

wherein R is a member selected from the group consisting of H and $CH_3$; R' is a member selected from the group consisting of H, $NH_2$, OH, SH; R'' is a member selected from the group consisting of H and $NH_2$, R' being $NH_2$ only when R'' is $NH_2$, and X is a member selected from the group consisting of

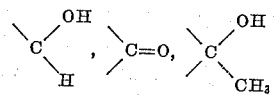

and the related intermediates thereof.

These compounds are useful therapeutic agents in the field of endocrinology as antihormones.

For the preparation of the compounds the β-dicarbonyl derivatives are reacted with urea, thiourea, guanidine, or trisformyl-amino-methane in order to obtain the above mentioned pyrimidines. Also the α-cyano-ketones or their ethers when reacted with guanidine or trisformyl-aminomethane yield the substituted pyrimidines.

The following examples are set forth as illustrating but not as limiting the invention.

EXAMPLE 1

2-cyano-3-methoxy-5α-androst-2-en-17β-ol 15 parts of methyl-iodide are added to a solution of 3 parts of 2α-cyano-5α-androstan-17β-ol-3-one and 0.8 part of sodium ethylate in 50 parts of ethanol. The solution is stored for 24 hours at room temperature and then treated in a reflux apparatus for 2 hours on a water-bath.

The solution is concentrated, diluted thoroughly with water, and extracted with dichloromethane. The organic phase is washed repeatedly with a 15% potassium hydroxide solution, then with water to neutrality and taken to dryness.

2.1 parts of 2-cyano-3-methoxy-5α-androst-2-en-17β-ol crystallize from methanol, M.P. 207–209° C.;

$[\alpha]_D = +68°$ (chloroform)

EXAMPLE 2

2-cyano-3-methoxy-17α-methyl-5α-androst-2-en-17β-ol 5 parts of 2α-cyano-17α-methyl-androstan-17β-ol-3-one are dissolved in 84 parts of methanol and 84 parts of an 8% potassium hydroxide aqueous solution. While stirring and operating near 35° C., 50 parts of dimethyl-sulfate and 84 parts of a 40% potassium hydroxide aqueous solution are separately added dropwise over a half hour period.

The solution is stirred for a further 4 hours at 35° C., diluted thoroughly with water, and then repeatedly extracted with benzene. The organic phase is washed repeatedly with a 12.5% potassium hydrate solution, then with water to neutrality, and eventually taken to dryness. Crystallization from methanol results in 3.2 parts of 2-cyano-3-methoxy-17α-methyl-5α-androst-2-en - 17β - ol, M.P. 207–209° C.;

$[\alpha]_D = +48°$ (chloroform)

EXAMPLE 3

2-cyano-3-methoxy-5α-estran-2-en-17β-ol 2.5 parts of 2α-cyano-5α-estran-17β-ol-3-one are dissolved in 40 parts of methanol and 42 parts of an 8% potassium hydroxide aqueous solution.

Operating at 34° C. with stirring, 25 parts of dimethyl-sulfate and 42 parts of a 40% potassium hydroxide aqueous solution are separately added dropwise over a half hour period. The solution is stirred for a further 5 hours at 34° C., then diluted thoroughly with water, and repeatedly extracted with benzene.

The benzene extracts, washed with Claisen's alkali, then with water to neutrality, are finally taken to dryness. Crystallization from methanol results in 1.4 parts of 2-cyano-3-methoxy-5α-estr-2-en-17β-ol, M.P. 203–204° C.;

$[\alpha]_D = +139°$ (chloroform)

EXAMPLE 4

2-cyano-3-ethoxy-17α-methyl-5α-androst-2-en-17β-ol 35 parts of diethyl-sulfate and 36 parts of a 40% potassium hydroxide solution are separately added dropwise over a half hour period into a solution of 2.5 parts of 2α-cyano-17α-methyl-5α-androstan-17β-ol-3-one dissolved in 36 parts of ethanol and 36 parts of an 8% potassium hydroxide solution, while stirring and operating near 35° C.

The solution is stirred for a further 4 hours at 35° C., diluted thoroughly with water, and extracted with benzene. The organic phase is repeatedly washed with a 12.5% potassium hydroxide solution, and then with water to neutrality.

Crystallization from methanol of the benzene extracts taken to dryness results in 1.8 parts of 2-cyano-3-ethoxy-17α-methyl-5α-androst-2-en-17β-ol, M.P. 180–184° C.;

$[\alpha]_D = +46°$ (chloroform)

EXAMPLE 5

2-cyano-3-ethoxy-5α-estr-2-en-17β-ol

A solution of 2 parts of 2α-cyano-5α-estran-17β-ol-3-one in 40 parts of benzene is treated in a reflux apparatus for 6 hours with 0.06 part of p.toluenesulfonic acid and 10 parts of ethanol. The solution is then cooled, added to one part of pyridine, repeatedly extracted with a 12% potassium hydroxide solution, washed with water to neutrality and taken to dryness.

Crystallization from methanol results in 1.2 parts of 2-cyano-3-ethoxy-5α-estr-2-ene-17β-ol, M.P. 159–161° C.;

$[\alpha]_D = +128°$ (chloroform)

EXAMPLE 6

2-cyano-3-n-butoxy-5α-androst-2-en-17β-ol

A solution of 1 part of 2α-cyano-5α-androstan-17β-ol-3-one in 25 parts of toluene is treated in a reflux apparatus with 2.8 parts of n-butanol and 0.045 part of p.toluenesulfonic acid, with removal of the water formed during the reaction.

After 6 hours, 1 part of pyridine is added.

The solution is taken to dryness. Crystallization from methanol results in 0.85 part of 2-cyano-3-n-butoxy-5α-androst-2-en-17β-ol, M.P. 93–96° C.;

$[\alpha]_D = +55°$ (chloroform)

EXAMPLE 7

*2-cyano-3-n-butoxy-17α-methyl-5α-androst-2-en-17β-ol*

A solution of 0.5 part of 2α-cyano-17α-methyl-5α-androstan-17β-ol-3-one in 25 parts of toluene is treated in a reflux apparatus with 0.05 part of p.toluenesulfonic acid and 2.5 parts of n-butanol, with removal of the water formed during the reaction.

After addition of 1 part of pyridine, the solution is taken to dryness; crystallization from methanol results in 0.45 part of 2-cyano-3-n-butoxy-17α-methyl-5α-androst-2-en-17β-ol, M.P. 120–123° C.;

$[\alpha]_D = +21$ (pyridine)

EXAMPLE 8

*2-cyano-3-n-butoxy-5α-estr-2-en-17β-ol*

2.5 parts of 2α-cyano-5α-estran-17β-ol-3-one are allowed to react in a reflux apparatus with 100 parts of benzene, 8 parts of n-butanol and 0.1 part of p.toluenesulfonic acid for 6 hours, with removal of the water formed during the reaction.

1 part of pyridine is added; then the solution is taken to dryness. Crystallization from methanol results in 2.3 parts of 2-cyano-3-n-butoxy-5α-estr-2-en-17β-ol, M.P. 79–81° C.;

$[\alpha]_D = +112°$ (chloroform)

EXAMPLE 9

*[3,2-d]-pyrimidine-5α-androstan-17β-ol*

0.5 part of 2-formyl-5α-androstan-17β-ol-3-one dissolved in 10 parts of formamide are added to 0.03 part of p.toluenesulfonic acid and 0.7 part of tris-formylamino-methane and heated for 7 hours at 160° C. The solution is poured into 50 parts of a normal sodium hydroxide solution, and extracted with chloroform. The organic phase is washed with sodium hydroxide and water, the water removed and taken to dryness.

Crystallization from acetone results in 0.27 part of [3,2-d] - pyrimidine - 5α - androstan-17β - ol, M.P. 189–191° C.;

$[\alpha]_D = +54°$ (chloroform)

EXAMPLE 10

*[3,2-d]-pyrimidine-17α-methyl-5α-androstan-17β-ol*

1.5 parts of 2-formyl-17α-methyl-5α-androstan-17β-ol-3-one are dissolved in 60 parts of formamide and added to 2.1 parts of tris-formylamino-methane and 0.09 part of p.toluenesulfonic acid. The solution is heated for 7 hours at 160° C., then is poured into 150 parts of a normal sodium hydroxide solution.

A precipitate forms and is extracted with a total amount of 200 parts of chloroform; the organic phase is washed three times with normal sodium hydroxide and then with water to neutrality and eventually taken to dryness.

Crystallization from acetone results in 0.77 part of [3,2-d]-pyrimidine-17α-methyl-5α-androstan-17β-ol, M.P. 201–204° C.;

$[\alpha]_D = +28°$ (chloroform)

EXAMPLE 11

*[3,2-d]pyrimidine-5α-androstan-17-one*

0.38 part of [3,2-d]-pyrimidine-5α-androstan-17β-ol are dissolved into 10 parts of N,N-dimethyl-formamide and, at a temperature near 10° C., and the solution is added in 5 minutes to 1.5 parts of Jones' reagent. After dilution with water and alkalization, the solution is extracted with chloroform. Solvent evaporation from the organic phase and crystallization from petroleum ether result in 0.265 part of [3,2-d]-pyrimidine-5α-androstan-17-one, M.P. 150–151° C.;

$[\alpha]_D = +120°$ (chloroform)

EXAMPLE 12

*(3,2-d)-pyrimidine-5α-estran-17β-ol*

4.5 parts of 2-formyl-5α-estran-17β-ol-3-one are dissolved in 180 parts of formamide and added to 5.3 parts of tris-formylamino-methane and 0.27 part of p.toluenesulfonic acid. The solution is stored for 7 hours at 160° C. under low vacuum.

The solution is poured into 800 parts of normal sodium hydroxide solution, extracted with chloroform and, after repeated washing with normal sodium hydroxide and water, taken to dryness.

Crystallization from methanol results in 2.8 parts of (3,2-d)-pyrimidine-5α-estran-17β-ol, M.P. 231–233° C.;

$[\alpha]_D = +126°$ (chloroform)

EXAMPLE 13

*(3,2-d)-pyrimidine-5α-estran-17-one*

2 parts of (3,2-d)-pyrimidine-5α-estran-17β-ol are dissolved in 40 parts of N,N-dimethyl-formamide and added in 5 minutes to 4 parts of Jones' reagent, with the temperature being kept near 10° C.

The solution is diluted with water, then adjusted to a pH of 4.5–5 with a 5% sodium bicarbonate solution and filtered.

Crystallization from acetone results in 1.72 parts of (3,2-d)-pyrimidine-5α-estran-17-one, M.P. 162–164° C.;

$[\alpha]_D = +190°$ (chloroform)

EXAMPLE 14

*(3,2-d)-(6'-amino)-pyrimidine-5α-androstan-17β-ol*

1 part of 2α-cyano-5α-androstan-17β-ol-3-one dissolved in 28 parts of formamide is added to 0.13 part of p.toluenesulfonic acid and 4 parts of tris-formylamino-methane.

The solution is stored for 7 hours at 160° C. under a low vacuum, then poured into 70 parts of a normal sodium hydroxide solution, extracted with chloroform, repeatedly washed with sodium hydroxide and then with water. The organic phase is eventually taken to dryness.

Crystallization from methanol results in 0.45 part of (3,2-d)-(6'-amino)-pyrimidine-5α-androstan-17β-ol, M.P. 254–257° C.;

$[\alpha]_D = +50°$ (chloroform)

EXAMPLE 15

*(3,2d)-(6'-amino)-pyrimidine-5α-androstan-17β-ol*

2 parts of 2-cyano-3-n-butoxy-5α-androst-2-en-17β-ol are dissolved in 50 parts of formamide and added to 2 parts of tris-formylamino-methane and 0.075 part of p.toluenesulfonic acid.

The solution is heated for 8 hours at 160° C. under low vacuum, poured into 150 cc. of normal sodium hydroxide, then extracted with chloroform. The chloroform extracts are washed three times with a total amount of 150 parts of normal sodium hydroxide, and then with water to neutrality, and finally taken to dryness. Crystallization from methanol results in 1.3 parts of (3,2-d)-(6'-amino)-pyrimidine-5α-androstan-17β-ol, M.P. 256–258° C.;

$[\alpha]_D = +50°$ (chloroform)

EXAMPLE 16

*(3,2-d)-(6'-amino)-pyrimidine-17α-methyl-5α-androstan-17β-ol*

1.5 parts of 2α-cyano-17α-methyl-5α-androstan-17β-ol-3-one dissolved in 50 parts of formamide are added to 6 parts of tris-formylamino-methane and 0.1 part of p.toluenesulfonic acid, and heated for 8 hours at 160° C. under low vacuum.

The solution is poured into 150 parts of normal sodium hydroxide, extracted with chloroform and water to neutrality. The organic stage is extracted with 200 parts of a 2 N hydrochloric acid solution.

The aqueous extracts after alkalization are extracted with 200 parts of chloroform. The chloroform extracts are washed with water and taken to dryness.

Crystallization of the residue from acetone results in 0.95 part of (3,2-d)-(6'-amino)-pyrimidine - 17α-methyl-5α-androstan-17β-ol, M.P. 287–289° C.;

$[\alpha]_D = +34°$ (pyridine)

EXAMPLE 17

*(3,2-d)-(6'-amino)-pyrimidine-17α-methyl-5α-androstan-17β-ol*

A solution of 0.8 part of 2-cyano-3-ethoxy-17α-methyl-5α-androst-2-en-17β-ol in 30 parts of formamide, added to 2.1 parts of tris-formylamino-methane and 0.05 part of p.toluenesulfonic acid, is heated for 8 hours at 160° C. under low vacuum. The solution is poured into 150 parts of a normal sodium hydroxide solution and extracted with 300 parts of chloroform.

The organic phase, after the usual washings with normal sodium hydroxide and water to neutrality, is taken to dryness. Crystallization of the residue from acetone results in 0.53 part of (3,2-d)-(6'-amino)-pyrimidine-17α-methyl 6α-androstan-17β-ol, M.P. 287–289° C.;

$[\alpha]_D = +34°$ (pyridine)

EXAMPLE 18

*(3,2-d)-(6'-amino)-pyrimidine-5α-estran-17β-ol*

A solution of 3 parts of 2-α-cyano-5α-estran-17β-ol-3-one in 100 parts of formamide is heated at 160° C. with 10 parts of tris-formylamino-methane and 0.15 part of p.toluenesulfonic acid. The solution is poured into 400 parts of a normal sodium hydroxide solution, then extracted with chloroform. After the usual washings with normal sodium hydroxide and water, the organic extracts are extracted again with a total amount of 300 parts of chloloform.

The organic phase is washed with water and taken to dryness. Crystallization of the residue from methanol results in 1.63 parts of (3,2-d)-(6'-amino)-pyrimidine-5α-estran-17β-ol, M.P. 300° C.;

$[\alpha] = _D +138°$ (pyridine)

EXAMPLE 19

*(3,2-d)-(2',6'-diamino)-pyrimidine-5α-androstan-17β-ol*

A solution of 3.3 parts of 2-cyano-3-methoxy-5α-androst-2-en-17β-ol in 50 parts of anhydrous ethanol is added to 1.1 parts of guanidine hydrochloride and 50 parts of a 3% sodium ethylate solution in ethanol. The solution is treated in a reflux apparatus for 20 hours and evaporated to dryness in vacuum.

The residue is suspended in boiling water and filtered. Crystallization from methanol results in 1.86 parts of (3,2-d)-(2',6'-diamino)-pyrimidine - 5α - androstan-17β-ol, M.P. 285° C.

U.V.:

$\lambda_{max}$.—
216, 281 mμ, ε=13,100 and 5,250 in methanol
257 mμ, ε=2,340

$\lambda_{min}$.—
220, 274 mμ, ε=14,200 and 4,600 methanol on N/100 hydrochloric acid
256μ, ε=2,380

I.R.: 2.9, 3.15, 6.1, 6.35, 12.8μ

EXAMPLE 20

*[3,2-d]-(2',6'-diamino)-pyrimidine-17α-methyl-androstane-17β-ol*

1 part of guanidine hydrochloride and 3.57 parts of 2-cyano-3-ethoxy - 17α - methyl - 5α - androst-2-en-17β-ol are added in succession to a solution of sodium ethoxide (from 0.25 parts of sodium) in 50 parts of ethanol and the mixture is heated in a stainless steel tube at 160–165° C. (bath) for 16 hours. The cooled contents of the tube are washed out with 5 parts of ethanol and taken to dryness under reduced pressure. The residue is shaken with 25 parts of benzene and 25 parts of water and the solid is collected. Recrystallization from ethanol yields 2.1 parts of pure [3,2-d]-(2',6'-diamino)-pyrimidine-17α-methyl-5α-androstan-17β-ol, M.P. 285°.

U.V.:

$\lambda_{mnx}$. 216, 281 mμε=13,000 and 5,300
$\lambda_{min}$. 257 mμ, ε=2,300 (methanol)
$\lambda_{max}$. 220, 274 mμ, ε=14,200 and 4,650
$\lambda_{min}$. 256 mu, ε=2,320 (methanol/HCl N/100)

I.R.: 2.9, 3.15, 6.11, 6.34, 12.82μ

EXAMPLE 21

*[3,2-d]-(2',6'-diamino)-pyrimidine-5α-estran-17β-ol*

0.5 part of guanidine hydrochloride and 1.76 parts of 2-cyano-3-n-butoxy-5α-estr-2-en-17β-ol are added in succession to a solution of sodium ethoxide (from 0.125 part of sodium) in 50 parts of ethanol and the mixture is heated in a stainless steel tube and washed out with 5 parts of ethanol and taken to dryness under reduced pressure. The residue is shaken with 25 parts of benzene and 25 parts of water and the solid is collected.

Recrystallization from methanol yields 0.9 part of pure [3,2-d]-(2',6'-diamino)-pyrimidine - 5α - estran - 17β - ol, M.P. 290° C.

U.V.:

$\lambda_{max}$. 216, 281 mμ, ε=13,100, and 5,300
$\lambda_{min}$. 257 mμ, ε=2,300 (methanol)
$\lambda_{max}$. 220, 274 mμ, ε=14,150 and 4,700
$\lambda_{min}$. 256 mμ, ε=2,320 (methanol/HCl N/100)

I.R.: 2.91, 3.15, 6.1, 12.81μ

EXAMPLE 22

*(3,2-d)-(2'-hydroxy)-pyrimidine-5α-androstan-17β-ol*

0.5 part of 2-formyl-5α-androstan-17β-ol-3-one dissolved in 10 parts of ethanol are allowed to react in a reflux apparatus for 2 hours with 0.45 part of urea and 0.5 part of 3 N hydrochloric acid.

After cooling, 1.5 parts of 10% potassium methoxide are added and the solution is treated in a reflux apparatus for 1 hour. The solution is concentrated under nitrogen, taken with 15% acetic acid to pH 5, then diluted with water and filtered.

Crystallization from methanol results in 0.21 part of (3,2-d)-(2'-hydroxy)-pyrimidine - 5α - androstan-17β-ol, M.P. 309–313° C.;

$[\alpha]_D = +41.5°$ (pyridine)

EXAMPLE 23

*(3,2-d)-(2'-hydroxy)-pyrimidine-17α-methyl-5α-androstan-17β-ol*

0.5 part of 2-formyl-17α-methyl-5α-androstan-17β-ol-3-one dissolved in 10 parts of ethanol are allowed to react in a reflux apparatus for 2 hours with 0.5 part of urea and 0.1 part of glacial acetic acid. After cooling, 2.5 parts of 10% potassium methoxide are added and the solution is treated in a reflux apparatus for 1 hour.

The solution is concentrated under nitrogen, taken to pH 5 with 15% acetic acid, diluted with water and filtered. Crystallization from methanol results in 0.18 part of (3,2-d)-(2'-hydroxy)-pyrimidine-17α-methyl-5α-androstan-17β-ol, M.P. 250–254° C.;

$[\alpha]_D = +36°$ (pyridine)

EXAMPLE 24

*(3,2-d)-(2'-mercapto)-pyrimidine-5α-androstan-17β-ol*

3 parts of 2-formyl-5α-androstan-17β-ol-3-one are dissolved in 50 parts of ethanol and allowed to react in a reflux apparatus for 3 hours with 1.05 parts of thiourea and 1 part of 3 N hydrochloric acid. The solution is concentrated under nitrogen, diluted with water and then filtered. Crystallization from methanol results in 1.95 parts of (3,2-d)-(2'-mercapto)-pyrimidine-5α-androstan-17β-ol, M.P. 249–249.5° C.;

$[\alpha]_D = +72°$ (pyridine)

EXAMPLE 25

*(3,2-d)-(2'-mercapto)-pyrimidine-5α-estran-17β-ol*

1.4 parts of 2-formyl-5α-estran-17β-ol-3-one are dissolved in 24 parts of pure ethanol and allowed to react in a reflux apparatus for 3 hours with 0.5 part of thiourea and 0.49 part of 3 N hydrochloric acid. The solution is concentrated, diluted with water and filtered.

Crystallization from acetone results in 0.62 part of (3,2-d)-(2'-mercapto)-pyrimidine-5α-estran-17β-ol, M.P. 208–210° C.;

$[\alpha]_D = +87°$ (tetrahydrofuran)

We claim:
1. A compound of the formula

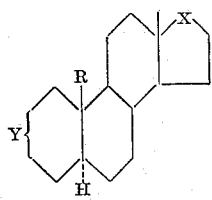

wherein R is a member selected from the group consisting of H and CH₃, X is a member selected from the group consisting of

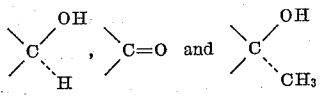

and Y is a member selected from the group consisting of

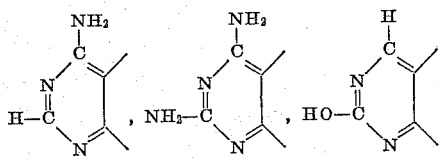

and

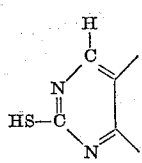

2. A compound of the formula

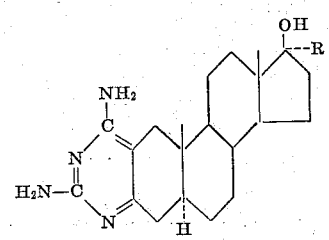

wherein R is selected from the group consisting of hydrogen and lower alkyl.

3. 2-cyano-3-methoxy-5α-androst-2-en-17β-ol.
4. 2-cyano-3-methoxy-17α-methyl - 5α - androst-2-en-17β-ol.
5. 2-cyano-3-methoxy-5α-estr-2-en-17β-ol.
6. 2-cyano-3-ethoxy-5α-androst-2-en-17β-ol.
7. 2-cyano-3-ethoxy - 17α - methyl - 5α - androst-2-en-17β-ol.
8. 2-cyano-3-ethoxy-5α-estr-2-en-17β-ol.
9. 2-cyano-3-n-butoxy-5α-androst-2-en-17β-ol.
10. 2-cyano-3-n-butoxy-17α-methyl - 5α - androst-2-en-17β-ol.
11. 2-cyano-3-n-butoxy-5α-estr-2-en-17β-ol.
12. [3,2-d] - (6'-amino)-pyrimidine - 5α - androstan-17β-ol.
13. [3,2-d]-(6'-amino)-pyridine - 17α - methyl-5α-androstan-17β-ol.
14. [3,2-d]-(6'-amino)-pyrimidine-5α-estran-17β-ol.
15. [3,2-d]-(2',6'-diamino) - pyrimidine-5α-androstan-17β-ol.
16. [3,2-d]-(2',6'-diamino)-pyrimidine - 17α - methyl-5α-androstan-17β-ol.
17. [3,2-d]-(2',6'-diamino) - pyrimidine - 5α - estran-17β-ol.
18. [3,2-d]-(2'-hydroxy)-pyrimidine - 5α - androstan-17β-ol.
19. [3,2-d]-(2'-hydroxy)-pyrimidine - 17α - methyl-5α-androstan-17β-ol.
20. [3,2-d]-(2'-mercapto)-pyrimidine - 5α - androstan-17β-ol.
21. [3,2-d] - (2'-mercapto) - pyrimidine - 5α - estran-17β-ol.

References Cited

UNITED STATES PATENTS

| | | | |
|---|---|---|---|
| 2,999,092 | 9/1961 | Colton et al. | 260—239.5 |
| 3,026,317 | 3/1962 | Ringold et al. | 260—239.5 |
| 3,132,137 | 5/1964 | Clinton | 260—239.5 |

LEWIS GOTTS, *Primary Examiner.*

H. FRENCH, *Assistant Examiner.*